United States Patent Office 3,184,285
Patented May 18, 1965

3,184,285
CONTINUOUS STABILIZATION OF WOOL WITH CHLORAMINES OR CHLORAMIDES AND A CHLORIDE-BROMIDE MIXTURE
Wilhelm Bitterli, Oberwil, Basel-Land, Switzerland, assignor to Ciba Limited, Basel, Switzerland, a company of Switzerland
No Drawing. Filed Mar. 26, 1962, Ser. No. 182,666
Claims priority, application Switzerland, Mar. 27, 1961, 3,618/61
9 Claims. (Cl. 8—127.6)

The chlorination of wool, that is to say the treatment of wool with chlorine or solutions of chlorine or hypochlorous acid, to render it resistant to shrinking and felting is known. It has also been proposed to chlorinate wool with the use of chloramines or chloramides as chlorine donor.

From U.S. patent application Serial No. 673,823 filed September 29, 1958 by Rud. Aenishaenslin et al., now abandoned and British specification 774,531 to Wolsey Limited published May 8, 1957, it is further known to treat wool with chloramines or chloramides in the presence of bromide ions. The aqueous treatment liquor which contains the chloramine or chloramide has invariably an acidic pH value to enable it to form active chlorine.

It has now been found that wool can surprisingly be rendered considerably resistant to felting and shrinking by treating it first in a substantially neutral liquor of latent reactivity which contains the chloramide or chloramide, and then in another reactive liquor which is as a rule strongly acidic, and contains the chloride and bromide ions.

The present invention provides a continuous process for rendering wool resistant to felting and shrinking by treatment with compounds containing the atomic grouping $$>N-Cl$$

more especially with a chloramine or chloramide and in the presence of halide ions, wherein the wool is first impregnated with an aqueous, inactive liquor having a pH value of 6.5 to 8.0 and containing a compound with the atomic grouping of the formula $$>N-Cl$$

the wool so impregnated then being transferred to another aqueous, active liquor having a pH value below 3 and containing chloride and bromide ions, and the wool so treated is then dechlorinated.

The present process is a substantial advance in the art of chlorinating wool to render it resistant to felting and shrinking, since it is now possible to improve wool by a continuous chlorinating operation without need to replenish the consumed chlorine continuously. According to the invention this is achieved by first treating the wool in a neutral chloramine or chloramide bath which has no effect on the wool. In a following, strongly acidic bath the chloramine or chloramide respectively is caused to react in the presence of chloride ions and bromide ions. The active chlorine present in this development bath causes spontaneous oxidation of the bromide ions to yield active bromine which in its turn reacts with the wool and it thus again reduced to bromide ions which are then again available for further reaction. The amount of bromide ions needed can be kept relatively small since the bromide is continually reformed in this redox process. When the wool impregnated with the first treatment liquor is transferred to the acidic development bath (which contains bromide and chloride ions) bromide is spontaneously formed as is revealed by the treatment liquor turning yellow. After a short time the bromide has once more been reduced to bromide ions.

It is a special advantage of this process that it is cyclic so that the development bath has a considerable period of usefulness.

As compounds containing the atomic grouping $$>N-Cl$$

there are suitable chloramines and chloramides. As chloramines there may be mentioned the chlorination products of ammonia and amines such as methylamine, dimethylamine, glycine and taurine. As chloramides there may be mentioned N-monochlorurea, N-chloracetamide, N:N-dichloracetamide, N:N-dichlorobiuret, N - chlorosuccinimide, N-chlorurethane, N - chlorosulphamic acid, N-chloro-para-toluenesulphonamide, N:N-dichloro-para-toluene-sulphonamide, N-monochloro-5:5-dimethyl-hydantoin, N - monochloro-5-methyl-5-isobutyl-hydantoin, 1:3-dichloro-5-methyl-5-ethyl-hydantoin, 1:3-dichloro-5-methyl-5-isobutyl-hydantoin, 1:3 - dichloro-5-methyl-5-phenyl-hydantoin and more especially N-chlorinated alkylol-melamines, advantageously such as contain 2 to 4 methylol groups, such as dimethylolmelamine or trimethylolmelamine; furthermore N-chlorinated 1:3:5-triazines such as tetrachloromelamine and the mono-, di- or trichloroisocyanuric acid.

As compounds furnishing bromide ions and chloride ions there are suitable hydrobromic and hydrochloric acid and their salts. It is of advantage to use water-soluble bromides or chlorides respectively, more especially alkali metal halides such as sodium bromide, potassium bromide, sodium chloride, or potassium chloride. When the halides are used in the form of metal halides, an acid is added to the solution, such as a conventional organic acid, such as formic or acetic acid or preferably a strong mineral acid such as hydrochloric, nitric or above all sulfuric acid.

When preparing the first, neutral bath (which contains the chloramide) it must be ensured that a stable dispersion is obtained which, when water-insoluble chloramines or chloramides are used, must be very fine. As a rule the chloramine or chloramide compound respectively is manufactured in situ, preferably with the use of sodium hypochlorite solution (Javel water). In this connection it is of advantage to use a non-ionic dispersant which is stable towards chlorine, for example a reaction product of a fatty alcohol and ethylene oxide and first to dissolve it in water, whereupon the amine or amide compound respectively is added. Javel water is then added and the whole is cautiously adjusted with sulfuric acid to a pH value of 6.5 to 8.0, preferably of 7.0 to 7.5. The chloramine or chloramide dispersion prepared in this manner is an opalescent, slightly yellowish liquid. As a rule there are used per liter of the aqueous liquor 2.5 to 7.5 grams, preferably 4 to 5 grams, of a non-ionic dispersant which is stable towards chlorine, as well as 7 to 25 grams of an amine or amide, and 5 to 15 grams of active chlorine in the form of Javel water. The liquor is generally prepared at room temperature. The treatment in this first impregnating bath takes about 10 to 60 seconds, and the amount of liquor absorbed may vary from 100 to 500. It is of advantage if the amount of chloride ions present in the second bath is about 50 to 400 times that of the bromide ions. When sodium chloride and sodium bromide are used, one liter of the liquor contains 25 to 100 grams of sodium chloride and 0.1 to 1 gram of sodium bromide. This bath is acidified and has advantageously a pH value below 3, preferably a pH value ranging from 0.5 to 1.5. The temperature of the development bath is 25 to 60° C., preferably 50° C. The time of treatment in this bath varies from 20 to 180 seconds, after which the material is expressed as exhaustively as possible.

After the development bath the wool is dechlorinated by a known method in a third bath, preferably a sodium bisulfite bath. It is of advantage, after rinsing, to perform as the last treatment a softening operation.

According to the invention, the impregnation of the wool with the successive aqueous liquors is performed continuously, with special advantage in a back-washing machine comprising 4 or 5 vats; each vat is followed by squeegee rolls to adjust the requisite liquor absorption. It is of advantage to maintain the liquor in the development bath in a uniform motion, if possible by application of the counter-current principle.

The order of succession of the treatment baths can be varied by interposing the rinse after the development bath which is then followed by the dechlorinating bath and the softening bath.

The wool to be treated by the present process may be wool combings, wool yarn, woolen knitwear or fabrics such, for example, as woolen blankets.

EXAMPLE 1

The following three baths are prepared separately:

(1) *Bath 1, chloramine dispersion.*—40 grams of a 12.5% solution of a condensation product of 1 molecular proportion of octadecyl alcohol with about 35 molecular proportion of ethylene oxide are dissolved in 1 liter of water at 20° C. 15 grams of dimethylolmelamine dissolved in 75 to 150 ml. of water heated to 50 to 80° C., as well as 10 grams of active chlorine in the form of a sodium hypochlorite solution are then added. The alkaline solution is carefully neutralized with sulfuric acid solution of 10% strength, for which purpose about 60 ml. are needed. The finished solution or opalescent dispersion respectively has a pH value of 7 to 7.5.

(2) *Bath 2, development bath.*—A solution of 50 grams of sodium chloride and 0.5 gram of sodium bromide in 1 liter of water heated at 50° C. is mixed with 8 grams of sulfuric acid of 98% strength to establish a pH value of 0.8.

(3) *Bath 3, dechlorinating bath.*—A solution of 1 gram of sodium bisulfite in 1 liter of water is slightly acidified with 0.2 gram of sulfuric acid of 98% strength.

(4) *Bath 4, rinsing vat with overflow.*

(5) *Bath 5, softening bath.*—1 to 5 grams of an aqueous paste of 25% strength of the acetate of the condensation product of 1 molecular proportion of stearic acid methylolamide with 1 molecular proportion of triethanolamine are dissolved at 30° C. in 1 liter of water, whereupon 1 ml. of formic acid of 80% strength is added.

10 grams of wool combings are impregnated with bath 1 for about 25 seconds and then squeezed to a weight increase of 250%. This is followed by development in a bath 2 at a temperature of 50° C. for about 50 seconds. The combings are expressed to a weight increase of about 100% and then dechlorinated in a bath 3 for about 25 seconds at a temperature of 30° C. The treated combings are then rinsed in baths 4 and 5 and softened. After having been dried, the wool combings so treated display good fastness to felting, as revealed by the test on a plate felting machine.

EXAMPLE 2

All following experiments were conducted exactly as described in Example 1. To prevent repetitions, only the essential features are mentioned below.

(a) *Wool yarn*

Chloramine bath containing per liter:
    20.8 grams of N-monochloro-para-toluene-sulphonamide containing 24% [1] of active chlorine, i.e. 5.0 grams of active chlorine per liter
    2 grams of a 30% solution of a condensate of a mixture of cetyl alcohol and oleyl alcohol with 15 (respectively 8) mols of ethylene oxide.
    20° C., pH=7.0. Treatment for 25 seconds. Liquor absorption: 400%

Development bath containing per liter:
    50 grams of sodium chloride
    0.5 gram of sodium bromide
    8 grams of sulfuric acid of 98% strength (i.e. $d=1.84$).
    55° C., pH=0.9. Treatment for 50 seconds. Material strongly expressed to a weight increase of about 100%.

Rinse—Running tap water, 25 seconds.

Dechlorinating bath containing per liter:
    2 grams of sodium bisulfite solution of 40% strength
    0.2 gram of sulfuric acid of 98% strength
    20° C., pH=3. Treatment for 25 seconds, material strongly expressed to a weight increase of about 100%.

Softening bath containing per liter:
    5 grams of a 25% paste of the acetate of the condensation product of 1 mol of stearic acid methylolamide with 1 mol of triethanolamine
    0.5 gram of formic acid.
    30° C., treatment for 25 seconds, material strongly expressed and then dried.

The concentration of active chlorine of the chloramine bath (containing per liter 4.78 grams of active chlorine) was still the same after two portions of 10 grams each of wool yarn had been passed through it, which indicates that no reaction affecting the wool substance takes place in the neutral solution of N-monochloro-para-toluenesulfonamide.

When the yarn so treated was subjected to the felting test for 30 minutes on a laboratory-type winch rotating at 80 revolutions per minute, in a solution, containing per liter, 5 grams of soap and 0.5 gram of sodium carbonate at 40° C., the yarn so tested was found to be completely open, in contradistinction to a tested specimen of untreated yarn which was completely felted.

(b) *Wool yarn*

Chloramine bath containing per liter:
    8.3 grams of dichloroisocyanuric acid with 64% of active chlorine, corresponding to 5.3 grams of active chlorine per liter
    6.2 grams of tetrasodium pyrophosphate
    1 gram of a 30% solution of a condensation product of a mixture of cetyl alcohol and oleyl alcohol with 15 (respectively 8) mols of ethylene oxide
    0.6 gram of calcined sodium carbonate
    20° C., pH=8.5, treatment for 25 seconds, weight increase: 400%.

Development bath containing per liter:
    50 grams of sodium chloride 0.5 gram of sodium bromide,
    8 grams of sulfuric acid of 98% strength
    50° C., pH=0.9, treatment for 50 seconds, material strongly expressed.

Rinse—running tap water.

Dechlorination—as under (a) above.

---

[1] A substance contains 100% of active chlorine when 100 mg. thereof yield 100 mg. of available chlorine, measured by iodometric titration.

Softening—as under (a) above, but prolonged for 50 seconds.

(c) Wool combings

Chloramine bath containing per liter:
    3.3 grams of trichloroisocyanuric acid with 91% of active chlorine, corresponding to 3 grams of chlorine per liter
    10 grams of a solution of tetrasodium pyrophosphate of 5% strength
    1 gram of a 30% solution of a condensation product of a mixture of cetyl alcohol and oleyl alcohol with 15 (respectively 8) mols of ethylene oxide
    2 cc. of sodium hydroxide solution of 40% strength
    20° C., pH=8, treatment for 25 seconds, weight increase: 490%.

Development bath containing per liter:
    50 grams of sodium chloride,
    0.5 gram of sodium bromide
    8 grams of sulfuric acid of 98% strength
    50° C., pH=0.9, treatment for 50 seconds. Material strongly expressed.

The material is then rinsed in the usual manner for 25 seconds, dechlorinated and softened for 50 seconds.

The chlorination effect of about 2%, calculated from the above data, plus the chlorine loss of the bath, ensures good fastness to felting of the wool combings so treated.

The plate felting machine test, conducted at 30 to 40° C. for 5 minutes with a solution, containing per liter, 5 grams of soap and 0.5 gram of sodium carbonate, reveals the untreated specimen to be completely felted while the treated material remains open.

(d) Wool combings

Chloramine dispersion containing per liter:
    70 grams of a 12.5% solution of a condensation product of 1 mol of octadecyl alcohol with about 35 mols of ethylene oxide
    15 grams of trimethylolmelamine
    10 grams of active chlorine in the form of Javel water
    60 ml. of sulfuric acid of 10% strength
    22° C., pH=7, treatment for 25 seconds. Weight increase 250%.

Development bath containing per liter:
    50 grams of sodium chloride
    1 gram of sodium bromide
    8 grams of sulfuric acid of 98% strength
    35° C., pH=0.9, treatment for 90 seconds. The material is rinsed for 25 seconds in running water, then dechlorinated and softened in the usual manner.

The felting tests carried out on a plate felting machine [see under (c) above] revealed good stability towards felting as against the untreated wool combings which were completely felted.

(e) Wool combings

Chloramine dispersion containing per liter:
    35 grams of a 12.5% solution of a condensation product of 1 mol of octadecyl alcohol with about 35 mols of ethylene oxide 12 grams of dimethylolamine
    10 grams of active chlorine in the form of Javal water
    60 ml. of sulfuric acid of 10% strength
    20°C., pH=7.2, treatment for 25 seconds. Weight increase 280% and 265% respectively.

Development bath 1 containing per liter:
    50 grams of sodium chloride
    0.5 gram of sodium bromide
    8 grams of sulfuric acid of 98% strength
    50° C., pH=0.8, treatment for 50 seconds. Rinse in running water for 25 seconds.

Dechlorination bath contains per liter:
    2 grams of sodium thiosulfate
    0.2 gram of formic acid of 85% strength
    30° C., treatment for 25 seconds, then drying.

Development bath 2 containing per liter:
    75 grams of sodium chloride
    0.2 gram of sodium bromide
    8 grams of sulfuric acid of 98% strength
    50° C., pH=0.8, treatment for 50 seconds, then rinsing and dechlorinating as above.

The felting tests (see under (c) above) reveal that the anti-felting finishes obtained with development baths 1 and 2 are approximately of the same good order.

(f) Wool yarn

Chloramine dispersion containing per liter:
    60 grams of a 30% solution of a condensation product of a mixture of cetyl alcohol and oleyl alcohol with 15 (respectively 8) mols of ethylene oxide
    30 grams of methylolmelamine etherified with methanol
    10 grams of active chlorine as Javel water.

The whole is stirred for 15 minutes at 22° C. and then adjusted to pH=7.1 with sulfuric acid of 10% strength. Material treated for 25 seconds; weight increase: 250%

Development bath containing per liter:
    50 grams of sodium chloride
    0.5 gram of sodium bromide
    8 grams of sulfuric acid of 98% strength
    50° C., pH=0.8, treatment for 50 seconds. Material strongly expressed, then rinsed in running water, dechlorinated with 2 grams of sodium bisulfite of 40% strength per liter and softened in the usual manner.

(g) Woolen blankets

Chloramine bath containing per liter:
    10.1 grams of tetrachlormelamine (99% of active chlorine), corresponding to 10 grams of active chlorine per liter 15 grams of borax, thoroughly mixed and pasted with 5 grams per liter of a 30% solution of a condensation product of a mixture of cetyl alcohol and oleyl alcohol with 15 to 8 mols of ethylene oxide, then made up with water to the desired volume. 20° C., pH=8.0.

To improve the solubility of tetrachloromelamine it may be slightly alkalinized with 0.5 gram of sodium carbonate per liter, the pH then being adjusted to 8.0 with dilute sulfuric acid.

Treatment for 25 seconds; weight increase 270%.

Development bath containing per liter:
    50 grams of sodium chloride
    0.5 gram of sodium bromide
    8 grams of sulfuric acid of 98% strength.
    50° C., pH=0.9, treatment for 120 seconds.

The material is then rinsed in running water and treated in the usual manner with sodium bisulfite and a softening agent.

Chlorine content per liter of the first bath:

| | Grams |
|---|---|
| Before the passage | 9.94 |
| After the passage | 9.65 |

The washing tests, carried out in a domestic washing machine at 40° C. for 30 minutes with a liquor containing per liter 5 grams of soap and 0.5 gram of sodium carbonate, repeated 3 times, gave the following results:

| | Shrinkage of the original area, in percent, after 3 washing tests |
|---|---|
| Untreated | −15.5 |
| Treated | +1.5 |

The pile of the untreated woolen blanket has undergone appreciable felting, while the pile of the treated woolen blanket remains intact.

EXAMPLE 3

125 to 130 kg. of wool combings in 24 ribbons are continuously chlorinated for 2 hours at a rate of 2 m. per minute in a 5-vat back-washing machine, the successive baths being prepared as follows.

Bath 1

Chloramine bath containing per liter:
  35 grams of a 12.5% solution of a condensation product of 1 mol of octadecyl alcohol with about 35 mols of ethylene oxide
  12 grams of dimethylolmelamine
  10 grams of active chlorine (Javel water)
  60 cc. of sulfuric acid of 10% strength.
  20–25° C., pH=6.8 to 7.2. Weight increase 250 to 300%.

Baths 2 and 3

Development baths containing per liter:
  50 grams of sodium chloride
  0.25 gram of sodium bromide
  8 grams of sulfuric acid of 98% strength.
  50° C., pH=0.8 to 1.5.
  Weight increase: in bath 2, 500–600%; in bath 3, 100%.

Bath 4

Running water applied through sprinkler tubes 15–20° C., weight increase 100%.

Bath 5

Dechlorination and softening. Bath contains per liter:
  2 grams of sodium thiosulfate
  5 grams of a 25% aqueous paste of the acetate of the condensation product from 1 mol of stearic acid methylolamide with 1 mol of triethanolamine
  0.5 gram of a 30% solution of a condensation product of a mixture of cetyl alcohol and oleyl alcohol with 15 (respectively 8) mols of ethylene oxide
  0.2 gram of formic acid of 80% strength.
  30° C., pH=5.5, weight increase 100%.

From Bath 3 the development liquor is recycled in counter current to Bath 2 which has its pH value maintained within the limits mentioned above by a continuous supply of dilute sulfuric acid to it.

The felted samples, tested after a period of 1 and 2 hours respectively, compared with undyed, untreated wool combings and with dyed worsted tops, were found to have very good stability to felting.

What is claimed is:

1. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient a compound with the atomic grouping of the formula N—Cl selected from the group consisting of chloramines and chloramides, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

2. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient a compound with the atomic grouping of the formula N—Cl selected from the group consisting of chloramines and chloramides, which compound is formed in situ from the corresponding chlorine-free product and sodium hypochlorite, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

3. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient a chloramine obtained in situ from an alkylolmelamine and sodium hypochlorite, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

4. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient the chloramine obtained in situ from dimethylolmelamine and sodium hypochlorite, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

5. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredients the chloramine obtained in situ from trimethylolmelamine and sodium hypochlorite, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

6. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient dichloroisocyanuric acid, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

7. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient trichloroisocyanuric acid, squeezing the fabric, transferring it continuously into a second aqueous bath having a pH value below 3 and containing alkali metal chlorides and alkali metal bromides, the alkali metal chlorides and alkali metal brodmides supplying as sole active ingredients chloride and bromide ions, the amount of chloride ions being 50 to 400 times that of the bromide ions, treating the fabric in this bath from 20 to 180 seconds, and dechlorinating the treated fabric.

8. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient N-monochloro-para-toluenesulphonamide, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

9. A continuous process for rendering wool fabric stable to felting and shrinking, which process comprises applying to the fabric for 10 to 60 seconds in an aqueous bath of latent reactivity, which bath has a pH value of 6.5 to 8.0 and contains as sole active ingredient tetrachloromelamine, squeezing the fabric, transferring it continuously into a second aqueous bath having a pH value below 3 and containing alkali metal chlorides and alkali metal bromides, the alkali metal chlorides and alkali metal bromides supplying as sole active ingredients chloride and bromide ions, the amount of chloride ions being 50 to 400 times that of the bromide ions, treating the fabric in this bath from 20 to 180 seconds, and dechlorinating the treated fabric.

References Cited by the Examiner
UNITED STATES PATENTS

| | | | |
|---|---|---|---|
| 2,702,737 | 2/55 | Koons | 8—128 |
| 2,714,051 | 7/55 | Barnes | 8—128 |
| 2,923,596 | 2/60 | Levin | 8—128 |
| 3,106,440 | 10/63 | Lewin | 8—128 |

FOREIGN PATENTS

| | | |
|---|---|---|
| 723,559 | 2/55 | Great Britain. |
| 774,531 | 5/57 | Great Britain. |
| 1,202,792 | 1/60 | France. |

OTHER REFERENCES

Alexander et al.: Wool Its Chemistry and Physics, pp. 166, 276 and 277, Pub. 1954 by Reinhold Pub. Corp., N.Y.C. TS 1547 A4.

NORMAN G. TORCHIN, *Primary Examiner.*

MORRIS O. WOLK, ABRAHAM H. WINKELSTEIN, *Examiners.*